United States Patent [19]

Fujimoto

[11] 3,987,235

[45] Oct. 19, 1976

[54] DEVOLATILIZATION OF ALKENYL AROMATIC POLYMERS

[75] Inventor: Sumio Fujimoto, Midland, Mich.

[73] Assignee: The Dow Chemical Company, Midland, Mich.

[22] Filed: Sept. 12, 1974

[21] Appl. No.: 505,299

[52] U.S. Cl. .............................. 528/481; 526/342; 526/346; 528/496
[51] Int. Cl.² .............. C08F 112/08; C08F 212/10
[58] Field of Search ............... 260/93.5 A, 85.5 R, 260/85.5 S

[56] References Cited
UNITED STATES PATENTS

| | | | |
|---|---|---|---|
| 2,255,729 | 9/1941 | Britton et al. | 260/93.5 A |
| 2,849,430 | 8/1958 | Amos et al. | 260/93.5 A |
| 3,536,787 | 10/1970 | Street | 260/93.5 A |
| 3,773,740 | 11/1973 | Szabo | 260/93.5 A |

Primary Examiner—Harry Wong, Jr.
Attorney, Agent, or Firm—Robert B. Ingraham

[57] ABSTRACT

Alkenyl aromatic polymers such as styrene polymers are devolatilized in a molten condition by the introduction of methanol and the volatiles removed under vacuum. A low level of residual monomer is readily obtained.

7 Claims, No Drawings

DEVOLATILIZATION OF ALKENYL AROMATIC POLYMERS

In the preparation of alkenyl aromatic resinous polymers by mass and solution polymerization, devolatilization is an important step. As polymer technology has progressed, the acceptable level of residual of volatile material such as monomer in a polymer has decreased. Various means have been employed in the past to remove volatile materials for alkenyl aromatic resins. By the term "alkenyl aromatic polymer resins" is meant a resinous polymer of one or more polymerizable alkenyl aromatic compounds or monomer. The polymer or copolymer comprises in chemically combined form at least 50 percent by weight of at least one alkenyl aromatic compound having the general formula

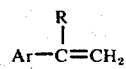

wherein Ar represents an aromatic hydrocarbon radical or an aromatic halo hydrocarbon radical of the benzene series R is hydrogen or the methyl radical. Examples of such alkenyl aromatic resins are the solid homopolymers of styrene, α-methylstyrene, orthomethylstyrene, metamethylstyrene, paramethylstyrene, Ar-ethylstyrene, Ar-vinylxylene, Ar-chlorostyrene, or Ar-bromostyrene; the solid copolymers of two or more such alkenyl aromatic cmpounds with minor amounts of other readily polymerizable olefinic compounds such as divinylbenzene, methyl methacrylate acrylonitrile, maleic anhydride, etc. Such polymers may be formed in the presence of rubber if desired. Methanol extraction has been employed (U.S. Pat. No. 2,619,008). Fluorocarbon compounds have been used to remove volatiles (U.S. Pat. No. 2,822,256). Vacuum apparatus in various forms have been employed (U.S. Pat. No. 2,849,430). Steam or water has been introduced into polymers to remove volatiles therefrom (U.S. Pat. No. 3,536,787). Various heating arrangements have also been employed (U.S. Pat. No. 3,668,161). The teaching of these patents is herewith incorporated by reference thereto.

It would be desirable if there were available a simple and direct method for the removal of monomeric constituents from alkenyl aromatic resins.

It would also be desirable if there were available a simple and direct means of devolatilizing alkenyl aromatic resins.

It would also be desirable if there were available a convenient method for the reduction of monomer content of alkenyl aromatic resins or polymers to a low level in a simple manner employing a readily recoverable devolatilizing agent.

These benefits and other advantages in accordance with the present invention are achieved in a method for the devolatization of an alkenyl aromatic resin polymer, the method comprising supplying a heat plastified mass of alkenyl aromatic resinous polymer at a devolatilizing temperature, introducing a volatile component into the mass to be devolatilized and subjectng the mass to a subatmospheric pressure to thereby remove as vapor volatile material introduced as well as at least a portion of undesired monomer and the like volatile material from the polymer mass, the improvement which comprises, employing methanol as a volatile substance introduced to the mass.

Devolatilization in accordance with the present invention is readily accomplished at normal devolatization temperatures for alkenyl aromatic resins. Most such alkenyl aromatic resins are generally devolatizied at temperatures in excess of 200° C. and at temperatures below which commercially sigificant decomposition of the polymer occurs. Oftentimes such devolatization are conducted at temperatures between about 250°–300° C. Generally in devolatizing in accordance with the invention it is desirable, if the polymerization is carried to a relatively low degree conversion, that is, below about 90 percent conversion of monomer to polymer or if it is carried out in the presence of solvent, usually a first devolatilization is desirable in order to remove a major portion of the readily removed volatile material such as solvent, monomer, or the like, prior to the addition of methanol to the heat plasticized polymer mass.

Generally in the practice of the present invention it is desirable to add methanol in a proportion of from about 0.1 to 5 parts by weight per 100 parts by weight of the polymer being devolatilized. The process of the present invention is particularly desirable when the amount of volatile material to be removed from the process stream is below about 1 weight percent and beneficially below about one-half weight percent. Methanol may be added to a process stream or to the polymeric mass being devolatilizied by any convenient method. Methanol or vapor or liquid may be directly injected into a polymer stream and mixed therewith under pressure sufficient to prevent or minimize the volatilization of the methanol, then the methanol containing polymer is subjected to a pressure low enough to permit vaporization of the methanol from the polymer and preferably to subatmospheric pressure such as pressures below about 100 millimeters of mercury wherein the polymer foams and at least a substantial portion of the volatiles in the polymer are carried away with the methanol vapor. Usually the methanol vapor is passed through a partial condenser having a temperature sufficiently low to condense the higher boiling volatile material such as a monomer, solvent and the like and to maintain the methanol as a vapor. In instances when the methanol is added to the polymer by the exposure of heat plastified polymer to methanol vapor under a pressure sufficient to cause solution of the methanol within the polymer, the polymer may subsequently be exposed to subatmospheric conditions and the methanol vapor and volatiles removed. In order to achieve maximum efficiency in devolatilization it is desirable that the methanol be dispersed generally uniformly throughout the process stream or mass being devolatilizied. This can be achieved by exposure of a thin (from about 0.1 to about 5 millimeters) flowing film of the polymer to methanol vapor, by injection of liquid methanol into a polymer stream and mechanically admixing the polymer stream with the methanol under suitable pressure. The method of the present invention reduces the level of volatile materials below a level obtained with other foaming devolatilizing agents.

By way of further illustration, a plurality of devolatilization experiments are conducted. A tray of polymer is positioned within an autoclave, the autoclave evacuated, purged with nitrogen and the autoclave heated to a temperature of 250° C. The polymer is exposed for a period of 10 minutes to an atmosphere of the devolatizing agents and subjected to vacuum at about 40 millimeters of mercury for a period of 10 minutes. Th autoclave and contents are then cooled and residual monomer in the polymer determined by vapor phase chromatography. The polymer used is a one-sixteenth inch thick compression molded sheet of polystyrene and the results are set forth in Table I wherein the vapor pressure is absolute pressure.

TABLE I

| Atmosphere | Atmosphere Vapor Pressure Gauge | Residual Styrene Weight Percent |
|---|---|---|
| Nitrogen | | 0.063 |
| Nitrogen | | 0.067 |
| Methanol, b.p. 64.7° C. | 15 psia | 0.016 |
| Methanol, | 40 psia | 0.024 |
| Methanol, | 115 psia | 0.015 |
| Methanol, | 205 psia | 0.010 |
| Methanol, | 280 psia | 0.009 |
| Ethanol, b.p. 78.4° C. | 80 psia | 0.050 |
| Benzene, b.p. 80.1° C. | 53 psia | 0.040 |
| n-Hexane, b.p. 68.7° C. | 55 psia | 0.046 |
| Acetone, b.p. 56.5° C. | 68 psia | 0.057 |
| Water, b.p. 100.0° C. | 55 psia | 0.033 |

The polymer before being devolatilized contained 0.12 weight percent residual styrene.

The foregoing procedure was repeated with the following exceptions. The polymer employed was a polymer of about 70 parts by weight of styrene and 25 parts by weight of acrylonitrile and contained 0.115 weight percent residual styrene. Devolatilization was conducted under vacuum at 245° C. for 10 minutes at a pressure of 35 millimeters of mercury. The results are set forth in Table II.

TABLE II

| Atmosphere | Pressure | Residual Styrene |
|---|---|---|
| Nitrogen | | 0.031% |
| Carbon Dioxide | 80 psia | 0.010% |
| Carbon Dioxide | 415 psia | 0.016% |
| Methanol | 80 psia | 0.004% |
| Methanol | 245 psia | 0.002% |
| Water | 95 psia | 0.018% |

In the foregoing experiments the quantity of methanol in the polymer is between about 0.1 and 5 parts by weight per 100 parts by weight of polymer. In the manner similar to the forgoing illustrations generally commensurate results are obtained employing the hereinbefore set forth alkenyl aromatic resinous polymers.

As is apparent from the foregoing specification, the present invention is susceptible of being embodied with various alterations and modifications which may differ particularly from those that have been described in the preceeding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a method for the devolatilization of an alkenyl aromatic resin polymer, by the term "alkenyl aromatic polymer resins" is meant a resinous polymer of one or more polymerizable alkenyl aromatic compounds or monomer, the polymer comprises in chemically combined form at least 50 percent by weight of at least one alkenyl aromatic compound having the general formula

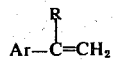

wherein Ar represents an aromatic hydrocarbon radical or an aromatic halo hydrocarbon radical of the benzene series R is hydrogen or the methyl radical, containing volatile material to be removed which is present in an amount below about 0.5%, the method comprising supplying a heat plastified mass of alkenyl aromatic resinous polymer at a devolatilizing temperature, introducing a volatile component into the mass to be devolatilized and subjecting the mass to a subatmospheric pressure to thereby remove volatile material introduced as well as at least a portion of undesired monomer and the like volatile material from the polymer mass, the improvement which comprises, employing methanol as a volatile substance introduced to the mass.

2. The method of claim 1 wherein the devolatilization temperature is between 200° and 300° C.

3. The method of claim 1 wherein the mass prior to introduction of the methanol contains from about 0.1 to 5 parts by weight per 100 parts by weight the polymer of undesired volatile materials other than methanol.

4. The method of claim 1 wherein the subatmospheric pressure is below about 100 millimeters of mercury and during devolatilization the plastified polymer foams.

5. The method of claim 1 wherein the alkenyl aromatic resin is polystyrene.

6. The method of claim 1 wherein the alkenyl aromatic resin is a copolymer of styrene and acrylonitrile.

7. In a method for the devolatilization of an alkenyl aromatic resin polymer, by the term "alkenyl aromatic polymer resins" is meant a resinous polymer of one or more polymerizable alkenyl aromatic compounds or monomer, the polymer comprises in chemically combined form at least 50 percent by weight of at least one alkenyl aromatic compound having the general formula

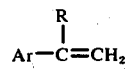

wherein Ar represents an aromatic hydrocarbon radical or an aromatic halo hydrocarbon radical of the benzene series R is hydrogen or the method radical, containing volatile material to be removed which is present in an amount below about 0.5%, the method comprising supplying a heat plastified mass of alkenyl aromatic resinous polymer at a devolatilizing temperature of between 200° and 300° C, introducing a volatile component into the mass to be devolatilized and subjecting the mass to a subatmospheric pressure below about 100 millimeters of mercury to thereby remove volatile material introduced as well as at least a portion of undesired monomer and the like volatile material from the polymer mass, the improvement which comprises, employing from about 0.1 to 5 parts by weight of methanol as a volatile substance introduced to each 100 parts by weight of mass.

* * * * *